Sept. 15, 1959  H. E. TOMPKINS  2,904,698
PHOTOCELL ACTUATED SYSTEMS
Filed April 3, 1953

INVENTOR
HOWARD E. TOMPKINS
BY
Laurence R. Brown
ATTORNEY

United States Patent Office 2,904,698
Patented Sept. 15, 1959

2,904,698

PHOTOCELL ACTUATED SYSTEMS

Howard E. Tompkins, Ridley Park, Pa., assignor to Burroughs Corporation, Detroit, Mich., a corporation of Michigan Application April 3, 1953, Serial No. 346,652

11 Claims. (Cl. 250—214)

This invention relates to systems responsive to radiant energy excitation. In more particularity it relates to photocell systems and methods for detecting a luminant signal and for controlling therewith a suitable load device.

Since photocells are, in general, responsive to radiant energy over a rather wide frequency spectrum range, they may become responsive to conditions other than the desired signals. For example, photoconductive cells constructed of materials such as lead sulfide may have a characteristic such that there is a change of sensitivity to luminant or radiant energy signals with changes in temperature. In most systems, however, it is desirable to provide constant sensitivity to the desirable luminant signals.

Therefore a general object of the invention is to provide improved radiant energy responsive systems.

It is another object of the present invention to provide photocell actuated systems affording relatively constant sensitivity to luminant signals even when operating under conditions in which extreme variations of temperature may occur.

It is another object of the invention to provide photocell responsive systems and methods for providing output signals as a direct function of luminosity.

A further object of the invention is to provide a light responsive system which is not sensitive to changes in temperature.

In accordance with the present invention there is therefore provided a photocell actuated system with means for exciting the cell to produce two separable varying components such as a periodically recurring luminance input signal component and a direct current bias component. By providing a corresponding impedance network the different current components may be separated to provide a pair of signals which are termed respectively alternating current (A.C.), exciting, and direct current (D.C.), control signals. By amplifying the exciting signal and varying the gain of an exciting signal amplifier by the control signal in the proper sense and amplitude, undesired variations in the A.C. exciting signal due to extraneous conditions such as temperature may be automatically compensated for so that the system provides output signals as a direct function of the desired input luminance. In one specific embodiment the desired signals are provided from a periodically recurring luminant source such as afforded by a light chopper between a luminant source and the photocell. A direct current bias potential is also provided which causes a current to flow through the photocell. This current changes as a function of the resistivity of the cell with changes of temperature or other unwanted conditions, and may be used to develop a corresponding control potential.

More detailed objects and features of advantage of the present invention will be found throughout the following specification. Those features believed descriptive of the nature of the invention are described with particularity in the appended claims. Details of construction are described in connection with the particular embodiment illustrated in the drawings, in which:

Those elements which of themselves may be entirely conventional and whose details form no part of the present invention are shown in block diagram form to more clearly point out the nature of the present invention. Throughout the specification the work photocell is utilized to generically define a radiant energy detector which might, for example, be a photo conductive lead sulfide cell.

Figure 1:
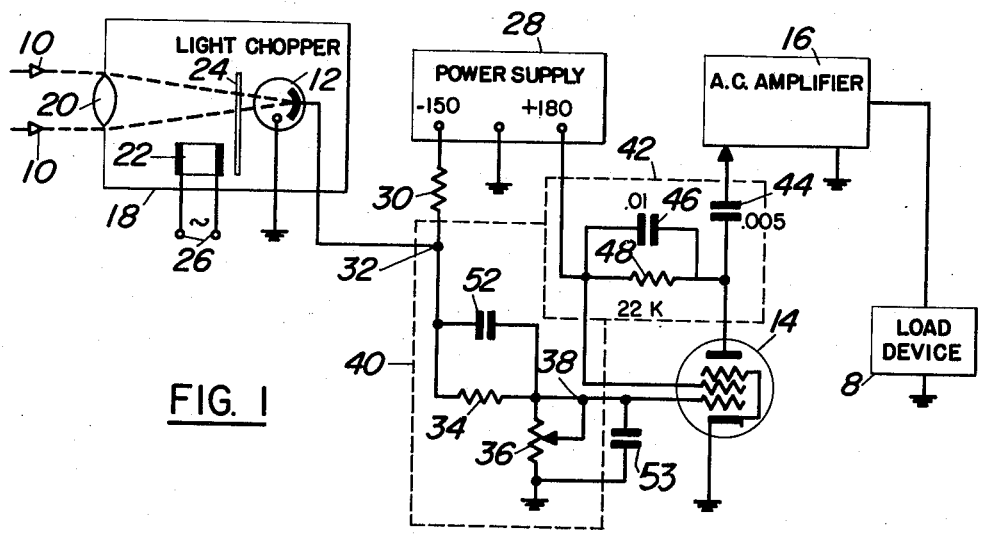
Fig. 1 is a combined block and circuit diagram of a photocell actuated system embodying the invention.

Referring now in particular to Fig. 1 of the drawing, a photocell actuated system of the type shown might be used in an automatic automobile headlamp switching system where the actuated load device 8 is automatically controlled as a function of the input luminance component of radiant energy represented by the rays 10. Thus, the presence of the light rays 10 from an approaching vehicle would be detected by the photocell 12 and amplified by means of the tube 14 and amplifier circuit 16 to actuate the load device 8 for automatically changing automobile headlamps from their bright position to their dim position.

An opaque photocell housing 18 is provided with a suitable lens system 20 for focusing the incoming light rays 10 upon the photo responsive surface of the photocell 12. A solenoid 22 is provided with a suitable light chopping member 24 arranged with an opaque screen adapted to pass or rapidly oscillate across and blank out the light beam. Thus, by application of an alternating current source to the solenoid terminals 26, the luminant input excitation to the cell is caused to periodically recur. It is to be recognized, of course, that other means may be used for chopping the light or causing the input signals to become periodically recurring.

A current excitation source for the photocell 12 may be provided such as the negative terminal of the power supply circuit 28 which provides to the cell 12 a direct current excitation component by means of resistor 30. Under ideal operating conditions the sensitivity of the photocell 12 should remain constant so that the direct current potential at the high potential lead 32 of network 40 would remain constant and have superimposed thereupon the alternating current potential component provided by the recurring input luminance. However, the sensitivity and resistance of some photocells such as lead sulfide cells changes with variations of temperature. In an automobile headlamp switching system of the type described, the photocell might be subjected to rather sharp changes of temperature in winter and summer. Thus, provisions need be taken to assure constant sensitivity during various temperature conditions.

Because the change of resistance of the cell causes a change in the direct current bias potential effective across the cell with the voltage divider action between resistor 30 and the photocell 12, the response to the same level of input excitation varies also due to this effect. By connecting a direct current voltage divider comprising resistors 34 and 36 across the photocell 12, the potential at the common intermediate connection 38 on the voltage divider network also varies as a function of the resistance of the photocell. This, in effect is a varying direct current component. Therefore by making resistor 36 adjustable, the proper voltage may be chosen for biasing the alternating current amplifier tube 14 at a position such that a change of gain due to a change in bias as a function of the photocell resistivity compensates for the change of photocell sensitivity and circuit response.

Figure 2:
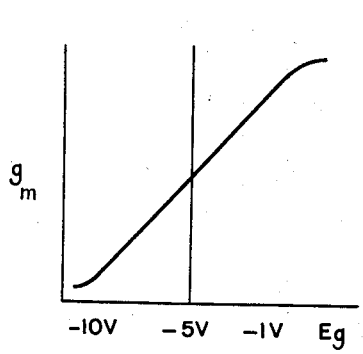
Fig. 2 is a graph illustrating operational principles of the described embodiment of the invention.

Operating parameters are chosen for the amplifier tube 14 such that the tube gain which is a function of $g_m$, varies in the manner illustrated by the graph of Fig. 2. Thus, when a bias potential such as −5 volts is selected, the trans-conductance $g_m$ of the tube varies substantially as a function of the input grid bias voltage $E_g$. The direct current component produced by the photocell therefore automatically changes the gain of the amplifier tube 14 in the desired manner. Tracing this action, it may be seen that with the usual characteristics of a lead sulfide cell, the resistance decreases as the temperature increases, and therefore the negative bias potential $E_g$ at the intermediate potential connection point 38 of the network 40 decreases with temperature to cause a corresponding increase in amplifier gain. By choosing the proper slopes and amplifier characteristics, a very good approximation may be made in keeping the overall sensitivity of the system substantially constant. Therefore, it is possible to provide output signals which are directly a function of the input luminance and not a function of temperature changes.

The actual degree of compensation desired in any particular instance may be matched approximately in the manner described. It has been found that the parameters given in the illustrated embodiment afforded satisfactory temperature compensation with a lead sulfide cell having a mean resistivity in the order of a half megohm when the amplifier tube 14 was the pentode section of a 6U8 electron tube. The light is chopped at about 120 cycles per second and the output network 42 in the plate circuit of tube 14 is chosen to provide a narrow bandpass of frequencies in this range. In such fashion, extraneous noise response components lying outside the bandpass response of the amplifier are reduced considerably. Coupling capacitor 44 is selected to block low frequencies and the undesired direct current temperature variations, and by-pass capacitor 46 shunts high frequencies. By properly choosing values of these components and the load resistor 48 the desired bandpass may be chosen by those skilled in the art to suit the requirements of any particular system.

Figure 3:
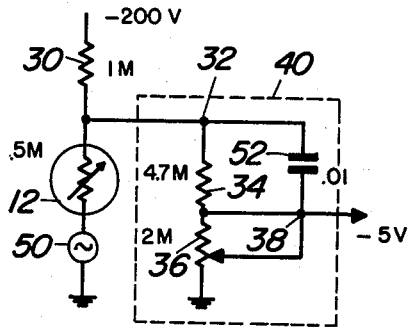
Fig. 3 is an equivalent circuit diagram setting forth the relationship of the various elements of one electrical network provided in accordance with the described embodiment of the invention.

Operational details of the system may be considered by referring to the simplified equivalent circuit diagram of Fig. 3. The photocell 12 may be considered a variable resistor 12 which has an alternating current signal source 50 connected in series therewith. Variations of resistance of the cell 12 with temperature causes a different amount of both A.C. signal and D.C. bias to appear at the intermediate potential terminal 38 of network 40, at which point the signal output potential is available. Substantially the entire A.C. signal appearing at the high potential connection 32 is developed between terminal 38 and the low potential or ground terminal by means of the low signal potential drop across the capacitive circuit of condensor 52. The capacitor 53 together with capacitor 52 is chosen to produce a voltage dividing effect upon the A.C. signal to properly adjust the signal level desirable at the grid of tube 14. However, the direct current bias component varies at terminal 38 as a function of the cell resistance by voltage divider action of resistors 34 and 36, since they are large as compared with the resistance of the photocell 12. This provides a varying bias or automatic gain control action at terminal 38 which serves to compensate for the change of sensitivity of the system due to changes of resistance.

The electrical network 40 therefore provides different response characteristics to the two current input components due to the periodically recurring radiant energy and the temperature responsive direct current variations. Bias changes are afforded in the output circuit by the resistive portion of network 40 and the signal energy is afforded a low loss path to the output circuit by the capacitor 52.

Considering in detail the design criteria of a typical system, the two outputs are respectively an A.C. signal which is a function of both light and temperature and a D.C. signal which is a function of temperature alone. The basic experimentally determined relationship between the light dependence and temperature dependence of a lead sulfide photocell can be stated as follows:

Let $r$ be the change in cell resistance $R_A$ when a chopped light beam of some convenient unit intensity impinges on the cell. Let T be temperature. Then $$\frac{1}{r} \cdot \frac{\partial r}{\partial T} = 3 \cdot \frac{1}{R_A} \cdot \frac{\partial R_A}{\partial T}$$

or $$\frac{\partial \log r}{\partial T} = 3 \cdot \frac{\partial \log R_A}{\partial T}$$

In words, the percentage change of cell sensitivity ($r$) with temperature is three times the percentage change of cell resistance with temperature, for small changes. Now let series resistor 30 in Fig. 3 be $R_B$ and the load resistance be $R_L$. With $R_A \ll R_B$ and $R_A \ll R_L$ the A.C. output signal $v$ is given by $$v = r \cdot \frac{V}{R_A} \text{ o } r \cdot \frac{V_0}{R_B}$$

where V is the potential across the photocell at terminal 32 and $V_0$ is the supply potential.
Thus $$\frac{\partial \log v}{\partial T} = \frac{\partial \log r}{\partial T}$$

and since V and R are constant with temperature, the D.C. output signal is $$V \underset{=}{\text{o}} R_A \cdot \frac{V_0}{R_B}$$

Hence $$\frac{\partial \log V}{\partial T} = \frac{\partial \log R_A}{\partial T}$$

and $$\frac{\partial \log v}{\partial T} = 3 \cdot \frac{\partial \log V}{\partial T}$$

This in words states that the percentage change of A.C. output signal with temperature is three times the percentage change of D.C. output signal with temperature. Now if the A.C. signal is passed through an amplifier whose gain is controlled by the D.C. signal in order to achieve a final A.C. signal, $v_f$, which is independent of temperature, the following relations must hold:

$$v_f = G(V) \cdot v$$

If $$\frac{\partial v_f}{\partial T} = 0$$

and $$\frac{\partial \log v_f}{\partial T} = 0$$

then $$\frac{\partial \log G(V)}{\partial T} + \frac{\partial \log v}{\partial T} = 0$$

and $$\frac{\partial \log G(V)}{\partial T} = -3 \frac{\partial \log V}{\partial T}$$

Assuming now that temperature is the only significant variable affecting V and G(V), this may be written $$\frac{\partial \log G(V)}{\partial \log V} = -3$$

This basic control equation states that the percentage change of gain of the amplifier should be made three times the percentage change of D.C. cell-circuit output voltage, and in inverse relationship. An important point to observe is that percentage change is involved in both the gain and voltage, not absolute magnitude change.

For a pentode amplifier with a load $R_1$, the gain is $G(V) = g_m R_1$. Hence a pentode is sought with a control ratio $$\eta = \frac{d \log g_m}{d \log V} = -3$$

as over a substantial region near $-5$ volts bias with the pentode section of the type 6U8 tube.

The D.C. output voltage from the photocell 12 is about $-30$ to $-50$ volts when it is desirable to operate for maximum sensitivity. It is therefore desirable to attenuate this to $-5$ volts to properly operate the 6U8 as is done with resistors 34 and 36. This causes the input potential $V_g$ to be $\alpha V$. Hence, $d \log V$ can replace $d \log V_g$ no matter what the value of $\alpha$. It follows that the adjustment $\alpha$ may be made on the sole basis of the tube characteristic, $\log g_m$ vs. $\log V_g$, in such a manner as to operate where the slope is $-3$. The capacitor 52 is provided about the upper resistor 34 to prevent attenuation of the desired signal $v$.

It is clear therefore that a highly improved system affording output signals from luminosity signal components with the same sensitivity during changes in operating temperatures is provided by the invention.

What is claimed is:

1. The combination comprising a photocell, means for applying both biasing voltage and a periodically interrupted radiant excitation energy to said photocell and for deriving unidirectional periodically recurring output signals therefrom, an amplifier comprising an electron tube, having at least one control electrode, means coupling said recurring output signals to said amplifier and biasing means including an impedance network in combination with said photocell for controlling the gain of said amplifier in response to variations in the ambient temperature, said biasing means being conductively connected to one of said control electrodes of said electron tube.

2. In combination, responsive device, means exciting the device with periodically interrupted radiant energy to produce an alternating signal current output component, means providing a direct current output component from said device, an amplifier responsive to the alternating current output component from said device, means for controlling the gain of the amplifier as a function of changes in the direct current output component of the device, and utilization means responsive to the combined effect of said output components.

3. The combination of a resistive network having high potential, intermediate potential and low potential terminal connections thereon, a photocell connected to the high and low potential terminals of said network, a source of potential, a resistance device connecting the high potential terminal of said source to the high potential terminal of said network whereby changing resistivity of the photocell changes the amount of current flowing from the source through the resistance network, an amplifier, a circuit biasing the amplifier with the potential developed between the intermediate and low potential terminals of said network, and an alternating current circuit coupling the high potential terminal of the photocell to said amplifier.

4. In a photocell responsive system comprising a light chopper for interrupting a substantially steady luminant signal, means for rapidly oscillating the light chopper across the luminant signal at a predetermined frequency, a photoconductive cell positioned to receive the interrupted luminant signal and to convert same to an alternating electrical signal, an amplifier having a grid input circuit and a plate output circuit, an impedance network electrically connected between the photoconductive cell output and the grid input circuit of the amplifier, the impedance network including a capacitive element arranged to couple the alternating electrical signal developed by the photoconductive cell to the grid input circuit of the amplifier, the plate output circuit of the amplifier including a band pass network arranged to pass a band of frequencies within a range including the interruption frequency of the light chopper, and a utilization circuit electrically connected to the output of the band pass network.

5. In a photocell responsive system sensitive to light and ambient temperatures and comprising a light condensing system for forming a beam of light, means to interrupt the light beam at a predetermined frequency, a photocell positioned to receive the interrupted light beam and convert same to an alternating exciting signal, an amplifier having at least a grid electrode and a plate electrode, a circuit network coupled between the output of the photoconductive cell and the grid electrode of the amplifier to thereby control the grid bias of the amplifier substantially in accordance with the resistive variations of said photocell, resistive means in the network operable to compensate the bias of the grid of the amplifier for changes in ambient temperature, capacitive means in the network operable to pass substantially all the alternating exciting signal of the photocell to the grid electrode of the amplifier, and frequency selective means coupled to the plate electrode of the amplifier passing only currents of a frequency range having the interruption frequency as a mean frequency.

6. In a photocell responsive system, an amplifier having a biasing circuit, a photocell characterized by having the property of being sensitive to light impingement thereon and to changes in ambient temperatures, means for interrupting the light impinging upon the photocell, means for connecting said photocell in parallel relation with the biasing circuit, unidirectional current biasing means common to the biasing circuit and the photocell, the biasing circuit including an impedance network effective to vary the amplifier bias proportional to the changes in ambient temperature and in the direction to compensate for the signal response of the photocell to such changes in ambient temperature to thereby offset the photocell's sensitivity to changes in the ambient temperature.

7. In an automobile headlight dimming system comprising a light chopper for interrupting a substantially steady luminant signal, means for rapidly oscillating the light chopper across the luminant signal at a predetermined frequency, a lead sulphide photocell positioned to receive the interrupted luminant signal and to convert same to an alternating electrical signal, the photocell characterized by having the property of being sensitive to light impingement thereon and to changes in ambient temperature, an electron tube amplifier having a control grid biased input circuit and a plate output circuit, an impedance network electrically connected between the lead sulphide photocell output and the control grid bias circuit, the impedance network including at least a capacitive and a resistive element in parallel relationship with respect to each other, the capacitive element effective to pass the alternating electrical signal to the grid input circuit and the resistive element effective to vary the bias of the amplifier in proportion to the response of the lead sulphide photocell to changes in the ambient temperature, and a frequency selective circuit coupled to the plate output circuit of the amplifier passing only currents of a frequency within a narrow range having the interrupting frequency as a mean frequency.

8. In an automobile headlight dimming system, a lead sulphide photocell adapted to receive a luminant signal and to convert same to an alternating electrical signal, the photocell characterized by having the property of being sensitive to light impingement thereon and to changes in ambient temperature, an electron tube amplifier having a control grid biased input circuit and a plate output circuit, an impedance network electrically connected between the lead sulphide photocell output and the control grid bias circuit, the impedance network including at least a capacitive and a resistive element in parallel relationship with respect to each other, the capacitive element effective to pass the alternating electrical signal to the grid input circuit and the resistive element effective to vary the bias of the amplifier in proportion to the response of the lead sulphide photocell to changes in the ambient temperature, and a frequency selective circuit coupled to the plate output circuit of the amplifier passing only currents of a frequency within a narrow range having the interrupting frequency as a mean frequency.

9. The method of compensating the output response of a photocell for its resistive sensitivity to variations in ambient temperature which comprises causing the photocell to produce an output response composed of a steady output current component and a periodically recurring output current component, one of said components being a signal resulting from radiant energy impinging on the photocell and the other of said components being a signal resulting from variations in the photocell's resistivity due to changes in ambient temperature, amplifying the signal component resulting from the radiant energy, modifying the amplification of said radiant energy signal component proportional to the strength of the other signal component and in a direction to compensate for changes in the ambient temperature.

10. The method of compensating the output response of a photocell system, including an amplifier, for its resistive sensitivity to variations in ambient temperature which comprises causing the photocell to produce an output response composed of a steady output current component and a periodically recurring output current component, adjusting exterior circuit values affecting the amplifier so that at least a major portion of the periodically recurring output current passes through circuit elements to be amplified in proportion to the strength of the other signal component and in a direction to compensate for changes in ambient temperature.

11. In a radiant energy responsive system including, in combination, a radiant energy responsive device, means for applying a biasing voltage to said device, means for directing radiant excitation energy upon said device, means for periodically interrupting the radiant energy received by said device, said separate means cooperating with the device for providing unidirectional recurring output electrical signals therefrom, an amplifier having at least one control electrode, means connecting the amplifier to the radiant energy responsive device so that the recurring output signals from the latter are delivered to the control electrode of the amplifier, and means including an impedance network connected to the control electrode of the amplifier and operable to compensate the action of the amplifier for changes in ambient temperature.

References Cited in the file of this patent

UNITED STATES PATENTS

| | | |
|---|---|---|
| Re. 23,295 | Liston | Nov. 21, 1950 |
| 2,202,060 | Mitchell | May 28, 1940 |
| 2,262,537 | Metcalf | Nov. 11, 1941 |
| 2,499,996 | Kelsey | Mar. 7, 1950 |
| 2,631,273 | Bagno | Mar. 10, 1953 |
| 2,632,040 | Rabinow | Mar. 17, 1953 |

FOREIGN PATENTS

| | | |
|---|---|---|
| 369,546 | Great Britain | Sept. 16, 1930 |
| 666,786 | Great Britain | Feb. 20, 1952 |

UNITED STATES PATENT OFFICE

CERTIFICATE OF CORRECTION

Patent No. 2,904,698                      September 15, 1959

Howard E. Tompkins

It is hereby certified that error appears in the printed specification of the above numbered patent requiring correction and that the said Letters Patent should read as corrected below.

Column 2, line 15, for "work photocell" read -- word photocell --;

column 5, line 40, before "responsive" insert -- a radiant energy --.

Signed and sealed this 5th day of April 1960.

(SEAL)
Attest:

KARL H. AXLINE                              ROBERT C. WATSON
Attesting Officer                          Commissioner of Patents